United States Patent Office 3,515,741
Patented June 2, 1970

3,515,741
1-CYANOPHENOXY-2-AMINO-ALKANES
Otto Thoma and Herbert Koppe, Ingelheim, Gerhard Ludwig, Wedel, and Anton Mentrup and Karl Zeile, Ingelheim, Germany, assignors to Boehringer Ingelheim G.m.b.H., Ingelheim am Rhine, Germany, a corporation of Germany
No Drawing. Continuation-in-part of application Ser. No. 448,881, Apr. 16, 1965. This application Nov. 8, 1967, Ser. No. 681,582
Claims priority, application Great Britain, Apr. 20, 1964, 16,202/64; Netherlands, Nov. 18, 1966, 6616293; Germany, Apr. 6, 1967, 1,593,771
Int. Cl. C07c *93/06, 121/52*; C07d *13/10*
U.S. Cl. 260—465                                   14 Claims

ABSTRACT OF THE DISCLOSURE 1-phenoxy-2-amino-alkanes of the formula

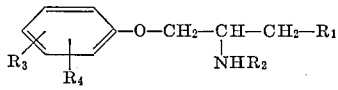

wherein $R_1$ is selected from the group consisting of hydrogen and alkyl of 1 to 3 carbon atoms, $R_2$ is selected from the group consisting of hydrogen and alkyl of 1 to 4 carbon atoms, $R_3$ is selected from the group consisting of trifluoromethyl and cyano, $R_4$ is selected from the group consisting of hydrogen, halogen and trifluoromethyl and $R_3$ and $R_4$ taken together may be methylenedioxy and their optical antipodes and their non-toxic, pharmaceutically acceptable acid addition salts which compounds are useful for curbing appetites of warm-blooded animals.

PRIOR APPLICATION

This application is a continuation-in-part application of our copending, commonly assigned patent application Ser. No. 448,881, filed Apr. 16, 1965, now abandoned.

OBJECTS OF THE INVENTION

It is an object of the invention to provide the novel 1-phenoxy-2-amino-alkanes of Formula I and their acid addition salts.

It is another object of the invention to provide novel anorexigenic compositions.

It is a further object of the invention to provide a novel method of curbing appetites of warm-blooded animals.

These and other objects and advantages of the invention become obvious from the following detailed description.

THE INVENTION

The novel 1-phenoxy-2-amino-alkanes of the invention are selected from the group consisting of compounds of the formula

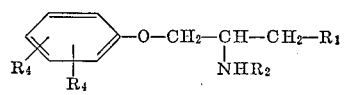

wherein $R_1$ is selected from the group consisting of hydrogen and alkyl of 1 to 3 carbon atoms, $R_2$ is selected from the group consisting of hydrogen and alkyl of 1 to 4 carbon atoms, $R_3$ is selected from the group consisting of trifluoromethyl and cyano, $R_4$ is selected from the group consisting of hydrogen, halogen and trifluoromethyl and $R_3$ and $R_4$ taken together may be methylenedioxy and their optical antipodes, and their non-toxic, pharmaceutically acceptable acid addition salts.

Since the compounds of the Formula I possess an asymmetrically-substituted carbon atom, they occur at racemic mixtures, which may be separated into their optical antipodes by conventional methods.

The compounds embraced by Formula I above are bases and, therefore, for acid addition salts and especially non-toxic, pharmacologically acceptable acid addition salts with inorganic or organic acids. Such acid addition salts may be prepared by conventional methods, such as by dissolving the free base compound in a suitable solvent and acidifying the solution with the desired acid. Examples of non-toxic, pharmacologically acceptable acid addition salts of the compounds of the Formula I are those formed with hydrochloric acid, hydrobromic acid, phosphoric acid, sulfuric acid, acetic acid, tartaric acid, citric acid, succinic acid, malic acid, maleic acid, 2-furoic acid, 8-chlorotheophylline and the like.

The phenoxy-2-amino-alkanes of Formula I may be prepared by a variety of methods as illustrated by the following methods.

Method A

By subjecting a phenoxy-alkanone of the formula

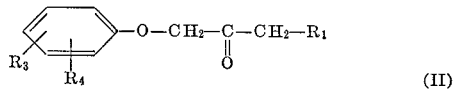

wherein $R_1$ and $R_4$ have the definitions of Formula I and $R_3$ is other than —CN to catalytic reduction, preferably with a nickel or platinum catalyst, in the presence of an ammonia compound of the formula $$NH_2-R_2 \quad\quad (III)$$

wherein $R_2$ has the definition of Formula I. In other words, this method may be used to prepare all of the compounds embraced by Formula I except those which have a cyano group attached to the phenyl moiety.

Method B

By subjecting a phenoxy-alkanone of the Formula II, wherein $R_1$, $R_3$ and $R_4$ have the definitions of Formula I, to reductive amination with a hydride, preferably with a complex metal hydride such as sodium borohydride, in the presence of an ammonia compound of the Formula III.

Method C

By reacting a phenoxy-alkanone of the Formula II, wherein $R_1$, $R_3$ and $R_4$ have the definitions of Formula I, with an ammonia compound of the Formula III in the presence of formic acid, for instance, by using a formic acid salt or a formyl compound of the ammonia compound III.

The phenoxy-alkanones II used as starting materials in Methods A through C may themselves be prepared according to conventional methods, such as from alkali metal phenolates and α-haloalkanones.

Method D

By subjecting an oxime of the formula

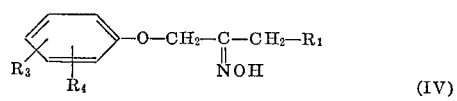

wherein $R_1$ and $R_4$ have the same meanings as in Formula I and $R_3$ is other than cyano to catalytic reduction, preferably with a nickel or cobalt catalyst, and subsequent monoalkylation of the free amino group to introduce the substituent $R_2$, if desired, by conventional methods. In other words, as with Method A, this method may be used to prepare all compounds embraced by Formula I except those wherein the phenyl moiety has a cyano substituent attached thereto.

Method E

By reducing an oxime of the Formula IV, wherein $R_1$, $R_3$ and $R_4$ have the definitions of Formula I, with a hydride, preferably with a complex metal hydride such as lithium aluminum hydride, and subsequent alkylation of the amino group, if desired.

The oximes IV used as starting materials in Methods D and E may themselves be prepared by known methods, preferably by reacting a phenoxy-alkanone II with hydroxylamine.

Method F

By subjecting an amine or Schiff's base of the formula

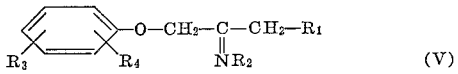

wherein $R_1$, $R_2$ and $R_4$ have the same meanings as in Formula I and $R_3$ is other than —CN to a catalytic reduction, preferably with a nickel, platinum or palladium catalyst.

Method G

By reducing an imine or Schiff's base of the Formula V, wherein $R_1$, $R_2$, $R_3$ and $R_4$ have the definitions of Formula I, with a hydride, preferably with a complex metal hydride such as sodium borohydride.

The starting compounds of the Formula V for Methods F and G may themselves be prepared by known methods, such as by reacting a phenoxy-alkanone of the Formula II with an ammonia compound of the Formula III, and need not be isolated from the reaction mixture prior to use in the reduction reactions of Methods F and G.

Method H

By reacting a 1-phenoxy-2-halo-alkane of the formula

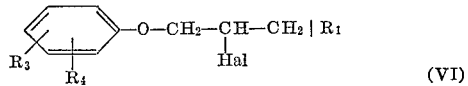

where $R_1$, $R_3$ and $R_4$ have the definition of Formula I and Hal is halogen, with an ammonium compound of the Formula III wherein all but one of the hydrogen atoms are preferably replaced by a protective group, such as benzyl, phthalyl and toluene-sulfonyl, which is readily removable by reduction or hydrolysis subsequent to the rection.

A compound of the Formula I wherein $R_3$ is cyano may also be prepared by the following methods:

Method I

By diazotizing a 1-aminophenoxy-2-amino-alkane of formula

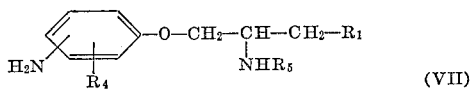

wherein $R_1$ and $R_4$ have the definition of Formula I and $R_5$ is alkyl of 1 to 4 carbon atoms and subsequently subjecting the diazotization product to a Sandmeyer-Reaction with a metal cyanide.

In those cases where the above Methods A through I yield compounds of the Formula I wherein $R_2$ is hydrogen, the free amino group may subsequently be mono-alkylated by conventional methods.

The compounds according to the present invention have useful pharmacological properties. More particularly, they exhibit a strong anorexigenic activity coupled with very low central stimulating activity in warm-blooded animals, such as mice and rats.

The novel anorexigenic compositions without any appreciable central nervous system stimulating activity of the invention are comprised of at least one compound selected from the group consisting of 1 - phenoxy-2-amino-alkanes of the formula

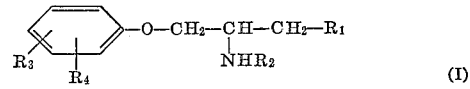

wherein $R_1$ is selected from the group consisting of hydrogen and alkyl of 1 to 3 carbon atoms, $R_2$ is selected from the group consisting of hydrogen and alkyl of 1 to 4 carbon atoms, $R_3$ is selected from the group consisting of trifluoromethyl and cyano, $R_4$ is selected from the group consisting of hydrogen, halogen and trifluoromethyl and $R_3$ and $R_4$ taken together may be methylenedioxy and their optical antipodes, and their non-toxic, pharmaceutically acceptable acid addition salts and a major amount of a pharmaceutical carrier.

For pharmaceutical purposes the compounds of the invention, that is, those embraced by Formula I, their optical antipodes and non-toxic acid addition salts of the racemic compounds and of the optical antipodes, are administered by the peroral or parenteral route, the peroral route being preferred, to warm-blooded animals as active ingredients in conventional dosage unit compositions, i.e., compositions consisting essentially of an inert pharmaceutical carrier and one dosage unit of the active ingredient, such as tablets, coated pills, powders, suspensions, solutions, suppositories, capsules and the like. One dosage unit of the compounds used as active ingredients in accordance with the present invention is from 10 to 150 mgm., preferably 20 to 100 mgm.

The novel method of the invention for curbing appetites in warm-blooded animals comprises administering to warm-blooded animals an anorexigenic effective amount of at least one compound selected from the group consisting of 1-phenoxy-2-amino-alkanes of the formula

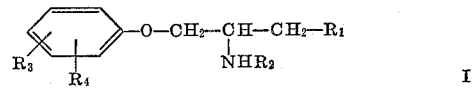

wherein $R_1$ is selected from the group consisting of hydrogen and alkyl of 1 to 3 carbon atoms, $R_2$ is selected from the group consisting of hydrogen and alkyl of 1 to 4 carbon atoms, $R_3$ is selected from the group consisting of trifluoromethyl and cyano, $R_4$ is selected from the group consisting of hydrogen, halogen and trifluoromethyl and $R_3$ and $R_4$ taken together may be methylenedioxy and their optical antipodes and their non-toxic, pharmaceutically acceptable acid addition salts. The usual effective dose of the said compounds is 0.016 to 5 mg./kg., preferably 0.16 to 2.5 mg./kg. of body weight of the warm-blooded animals. In the following examples there are described several preferred embodiments to illustrate the invention. However, it should be understood that the invention is not intended to be limited to the specific embodiments.

EXAMPLE I

Preparation of 1-(3',4'-methylenedioxy-phenoxy)-2-amino-propane and its hydrochloride 10.5 gm. (0.05 mol) of 1-(3',4'-methylenedioxy-phenoxy)-acetonoxime were dissolved in 100 cc. of methanol and the solution was hydrogenated at 40° C. and 5 atmospheres with Raney nickel as a catalyst. After the theoretical amount of hydrogen had been absorbed, the reaction mixture was filtered to remove the catalyst, and the methanol was distilled off in vacuo. The oily residue, raw 1 - (3',4' - methylenedioxy - phenoxy) - 2 - amino-propane, was admixed with ethereal hydrochloric acid, and the precipitate formed thereby was separated by vacuum filtration and recrystallized from a mixture of methanol and ether. 7.5 gm. of a substance having a melting point of 197–198° C. were obtained. It was identified to be 1 - (3',4' - methylene - dioxy - phenoxy) - 2 - aminopropane hydrochloride of the formula

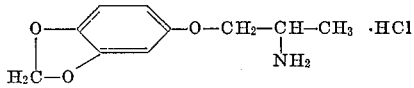

EXAMPLE II

Preparation of 1-(4'-cyano-phenoxy)-2-isopropylaminopropane and its hydrochloride 8.75 gm. (0.05 mol) of p-cyanophenoxy-acetone were dissolved in 50 cc. of absolute ethanol, 9 gm. (0.15 mol) of isopropylamine were added to the solution while cooling it with ice water and the mixture was stirred for one hour at room temperature. Thereafter, a solution of 1.2 gm. of sodium borohydride in 40 cc. of ethanol was added dropwise over a period of twenty minutes, and then the mixture was heated for one hour at 40–50° C. Subsequently, the reaction solution was cooled and, while continuing to cool, it was admixed with hydrochloric acid until it was neutral. The ethanol was then distilled off, the residue was extracted with ether, the aqueous phase was admixed with ammonia and again extracted with ether. The extract solution was dried over magnesium sulfate and then evaporated on a water bath. The residue, raw 1-(4'-cyano-phenoxy)-2-isopropylamino-propane, was dissolved in ethanol, the resulting solution was acidified with ethereal hydrochloric acid, and the precipitate formed thereby was collected and recrystallized from a mixture of ethanol and ether. 4.6 gm. of a substance having a melting point of 180–182° C. were obtained. It was identified to be 1-(4'-cyanophenoxy)-2-isopropylamino-propane hydrochloride of the formula

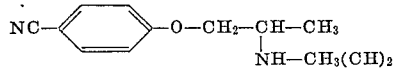

EXAMPLE III

Preparation of 1-(4'-cyanophenoxy-2-ethylamino)-propane and its hydrochloride 26.65 gm. (0.15 mol) of p-cyanophenoxy-acetone were dissolved in 150 cc. of ethanol and then, while cooling the solution, 22.5 gm. (0.5 mol) of ethylamine were stirred in, and the mixture was stirred at 20° C. for one hour. Thereafter, a solution of 3.8 gm. (0.1 mol) of sodium borohydride in 100 cc. of ethanol was added dropwise over a period of thirty minutes, the mixture was heated at 40–50° C. for one hour and then, while cooling, the reaction mixture was neutralized with hydrochloric acid. The ethanol was distilled off in vacuo, the residue was admixed with ammonia, the alkaline solution was extracted with ether and the ethereal extract solution was washed with water and dried over magnesium sulfate. Thereafter, the ether was distilled off and the residue, raw 1-(4'-cyano-phenoxy)-2-ethylamino-propane, was dissolved in ethanol, and the resulting solution was acidified with ethereal hydrochloric acid. The precipitate formed thereby was collected and recrystallized from a mixture of ethanol and ether. 25.8 gm. of a substance having a melting point of 147–149° C. were obtained. It was identified to be 1-(4'-cyanophenoxy)-2-ethylaminopropane hydrochloride of the formula

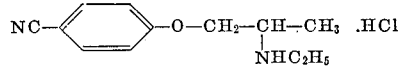

EXAMPLE IV

Preparation of 1-(4'-cyano-phenoxy)-2-isopropylamino propane·HCl 16.7 gm. (0.1 mol) of 1-(4'-cyano-phenoxy)-2-propanol, obtained by selective reduction of the 1-(4'-cyanophenoxy)-acetone with NaBH₄, were reacted with 14.3 gm. (0.12 mol) of SOCl₂ in 100 ml. of benzene. After the exothermic reaction had subsided, the reaction mixture was heated for 1 hour at 80° C. and then the benzene and the volatile constituents were distilled off in vacuo. The brown-colored residue which contained 1-(4'-cyanophenoxy)-2-chloropropane was allowed to stand for 12 hours at 20° C. in its raw state with 20 ml. of isopropylamine in 50 ml. of benzene. Thereafter, the dark solution was heated for 2 hours at reflux and then the volatile constituents were distilled off in vacuo. The residue was digested with ether and after water was added thereto, the residue was separated. After the organic phase had been separated, it was again washed with water and then extracted with 1-N hydrochloric acid. The separated acid phase was shaken with active carbon and filtered. The filtrate was made alkaline with NaOH and the precipitating oily base was taken up in ether. After drying over MgSO₄, the filtrate was vacuum filtered and the ethereal solution was concentrated. The remaining residue was taken up in ethanol and admixed with ethereal hydrochloric acid. The separated acid phase was shaken with active carbon and filtered. The filtrate was made alkaline with NaOH and the precipitating oily base was taken up in ether. After drying over MgSO₄, the filtrate was vacuum filtered, and the ethereal solution was concentrated. The remaining residue was taken up in ethanol and admixed with ethereal hydrochloric acid. 1-(4-cyanophenoxy)-2-isopropylamino-propane hydrochloride, precipitating in oily form, was digested with ether after having been decanted off and finally was recrystallized from ethanol by addition of ether to obtain the said product having a melting point of 181°–184° C.

EXAMPLE V

Preparation of 1-(2'-cyanophenoxy)-2-ethylamino-propane·HCl 8.75 gm. (0.05 mol) of 2-cyanophenoxy-acetone were dissolved in 75 ml. of methanol and after 13 ml. of ethylamine were added thereto, the mixture was stirred for 2 hours at room temperature. Next, 1.2 gm. of NaBH₄ dissolved in 50 ml. of methanol was added dropwise over 15 minutes at a temperature of 15°–20° C. Then the mixture was heated for 30 minutes at 45°–50° C. After having been cooled, the solution was acidified while cooling with hydrochloric acid and then concentrated in a rotation evaporator. The residue was extracted with 75 ml. of water and 50 ml. of ether, and the aqueous phase was again extracted with ether after having been separated. Next, the aqueous phase was made alkaline with sodium hydroxide, the precipitating base was dissolved in ether. The ethereal solution was washed until neutral, dried over magnesium sulfate and evaporated to dryness. The residue was dissolved in acetonitrile and admixed with ethereal HCl. After having been cooled, the hydrochloride crystallized and was vacuum filtered, then washed first with cold acetonitrile and then with ether to obtain 5.6 gm. of 1-(2'-cyanophenoxy)-2-ethylamino-propane hydrochloride having a melting point of 182–183° C.

EXAMPLE VI

Preparation of 1-(2'-cyanophenoxy)-2-isopropylamino-propane·HCl

Using the procedure of Example V, 8.75 gm. (0.05 mol) of 2-cyanophenoxy-acetone were dissolved in methanol and the solution was admixed with 8.85 gm. (0.15 mol) of isopropylamine followed by reduction with NaBH₄ and treatment with hydrochloric acid in ether to obtain 4 gm. of 1-(2'-cyanophenoxy)-2-isopropylamino-propane hydrochloride having a melting point of 188°–190° C.

EXAMPLE VII

Preparation of 1-(2'-cyanophenoxy)-2-propylamino propane·HCl

Using the procedure of Example V, 8.75 gm. (0.05 mol) of 2-cyanophenoxyacetone in ethanol were reacted with 8.85 gm. (0.15 mol) of propylamine and the resulting product was reduced with NaBH$_4$. After processing and precipitating as hydrochloride, the hydrochloride was recrystallized from ethanol with an addition of ether to obtain 2.8 gm. of pure white crystals of 1-2′-cyanophenoxy)-2-propylamino-propane hydrochloride having a melting point of 152°–153° C.

EXAMPLE VIII

Preparation of 1-(3′-cyanophenoxy)-2-isopropylamino-propane·HCl

Using the procedure of Example V, 8.75 gm. (0.05 mol) of 3-cyanophenoxyacetone in 75 ml. of ethanol were reacted with 12 ml. of isopropylamine and then reduced with NaBH$_4$. After the base had been isolated, the hydrochloride was obtained and recrystallized from ethanol with an addition of ether to obtain 6.6 gm. of crystallized 1-(3′-cyanophenoxy)-2-isopropylamino-propane hydrochloride having a melting point of 204°–206° C.

EXAMPLE IX

Preparation of 1-(3′-cyanophenoxy)-2-methylamino-propane·HCl

Using the procedure of Example V, 13.1 gm. (0.075 mol) of 3-cyanophenoxy-acetone in ethanol were admixed with 15 ml. of methylamine and then reduced with NaBH$_4$. The oily base in ethanol solution was admixed with ethereal HCl with the hydrochloride precipitating in crystalline form. After being recrystallized from ethanol by an addition of ether, 11.4 gm. of 1-(3′-cyanophenoxy)-2-methylamino-propane hydrochloride having a melting point of 191°–192° C. were obtained.

EXAMPLE X

Preparation of 1-(2′-cyanophenoxy)-2-methylamino-propane·HCl

Using the procedure of Example V, 13.1 gm. (0.075 mol) of 2-cyanophenoxy acetone in ethanol were reacted with methylamine and reduced with NaBH$_4$. The oily base was converted into its hydrochloride by an addition of ethereal HCl and it was then recrystallized from ethanol by an addition of ether to obtain 4.9 gm. of an analytically pure 1 - (2′-cyanophenoxy)-2-methylamino-propane hydrochloride having a melting point of 173°–175° C.

EXAMPLE XI

Preparation of 1-(3′-cyanophenoxy)-2-ethylamino-propane·HCl

Using the procedure of Example V, 8.75 gm. (0.05 mol) of 3-cyanophenoxyacetone dissolved in 100 ml. of ethanol were reacted with ethylamine and subsequently the product was reduced with NaBH$_4$. After having been processed, the free base in ethanol was precipitated with ethereal HCl as its hydrochloride. After recrystallizing, 8.4 gm. of 1 - (3′-cyanophenoxy)-2-ethylamino-propane hydrochloride having a melting point of 178°–179° C. were obtained.

EXAMPLE XII

Preparation of 1-(3′-cyanophenoxy)-2-propylamino propane·HCl

Using the procedure of Example V, 8.75 gm. (0.05 mol) of 3-cyanophenoxy-acetone in ethanol solution were reacted with propylamine and the product was reduced with NaBH$_4$. The base, after having been processed in ethanol solution, was precipitated as its hydrochloride with ethereal HCl. By recrystallization from ethanol by an addition of ether, 8.0 gm. of colorless 1-(3′-cyanophenoxy)-2-propylamino-propane hydrochloride having a melting point of 155°–156° C. were obtained.

EXAMPLE XIII

Using the procedure of Example I, 1-(3′,4′-methylenedioxyphenoxy) - 2 - methylamino-propane hydrochloride having a melting point of 150–152° C. was obtained.

EXAMPLE XIV

Using the procedure of Example I, 1-(3′4′-methylenedioxyphenoxy)-2-ethylamino-propane hydrochloride having a melting point of 174° C. was obtained.

EXAMPLE XV

Using the procedure of Example I, 1-(3′,4′-methylenedioxyphenoxy) - 2 - propylamino-propane hydrochloride having a melting point of 126–128° C. was obtained.

EXAMPLE XVI

Using the procedure of Example III, 1-(4′-cyanophenoxy)-2-methylamino-propane hydrochloride having a melting point of 134–137° C. was obtained.

EXAMPLE XVII

Using the procedure of Example III, 1-(4′-cyanophenoxy)-2-propylamino-propane hydrochloride having a melting point of 137–139° C. was obtained.

EXAMPLE XVIII

Using the procedure of Example I, 1-(3′,4′-methylenedioxyphenoxy) - 2-isopropylamino-propane hydrochloride having a melting point of 149–150° C. was obtained.

EXAMPLE XIX

Preparation of 1-(3′-trifluoromethylphenoxy)-2-amino-propane·HCl 21.7 gm. (0.093 mol) of 1-(3′-trifluoromethylphenoxy)-2-propanonoxime in 75 ml. of methanol were hydrogenated over Raney-nickel at a temperature of 60° C. and under a pressure of 5 atmospheres. After the catalyst had been removed, the solvent was distilled off. The remaining residue was taken up in ether and the ether solution was extracted several times with 1-N-hydrochloric acid and the aqueous phases were combined. After the addition of an excess of 20% sodium hydroxide, the precipitating base was dissolved in ether. The ether solution was dried over magnesium sulfate and then the ether was distilled. The residue was dissolved in a small amount of ethanol and admixed with ethereal hydrochloric acid whereby 1-(3′-trifluoromethylphenoxy)-2 - amino - propane hydrochloride was precipitated. The precipitate was filtered off and was once more recrystallized from ethanol/ether. The yield was 15.2 gm. of the said hydrochloride having a melting point of 178–179° C.

EXAMPLE XX

Preparation of 1-(3′-trifluoromethylphenoxy)-2-isopropylamino-propane·HCl 10.9 gm. (0.05 mol) of 1-(3′-trifluoromethylphenoxy)-2-propanone were dissolved in 75 cc. of methanol and the resulting solution was admixed with 15 ml. of isopropylamine and allowed to stand overnight at room temperature. Next, a solution of 3.8 gm. (0.1 mol) of sodium borohydride in 100 ml. of ethanol was added dropwise thereto with stirring and the mixture was heated for one hour at 60° C. After the reaction mixture had been cooled, it was acidified with hydrochloric acid and processed as described in Example XIX to obtain 6.9 gm. of 1-(3′-trifluoromethylphenoxy)-2-isopropylamino-propane hydrochloride, which after recrystallization from ethanol/ether, had a melting point of 143–144° C.

EXAMPLE XXI

Preparation of 1-(3′-trifluoromethylphenoxy)-2-methylamino-propane·HCl 10.9 g. (0.05 mol) of 1-(3′-trifluoromethylphenoxy)-2-propanone were dissolved in 75 ml. of ethanol and after 15 ml. of methylamine were added, the mixture was allowed to stand for 12 hours at 20° C. then 3.8 g. (0.1 mol) of NaBH$_4$ dissolved in 100 ml. of ethanol were dropped in. The mixture was then heated for one hour and acidified with diluted HCl. Then, the solution was evaporated in vacuo, the residue digested with water and the neutral particles were extracted with ether. The aqueous phase was made alkaline with NaOH, and the precipitated base was taken up with ether. The etheral solution was washed with water, dried over MgSO$_4$ and evaporated in vacuo. The residue was dissolved in a little quantity of ethanol and ethereal HCl was added. The precipitating crystals were filtered off and recrystallized from alcohol under addition of ether to obtain 8.6 g. of 1-(3'-trifluoromethylphenoxy)-2-methylamino-propane hydrochloride having a melting point of 158–159° C.

PHARMACEUTICAL EXAMPLES

Example A

| | Mg. |
|---|---|
| 1-(2'-cyanophenoxy)-2-methylamino-propane hydrochloride | 75.0 |
| Lactose | 25.0 |
| Sec. calcium phosphate | 150.0 |
| Cornstarch | 206.0 |
| Colloidal silicic acid | 12.0 |
| Stearic acid | 4.0 |
| Soluble starch | 8.0 |
| | 480.0 |

Preparation: The mixture of the active substance was granulated in the usual manner with the adjuvants, supporting agents and lubricants and compressed into tablets.

Example B (tablets)

| | |
|---|---|
| 1-(4'-cyanophenoxy)-2-isopropylamino propane hydrochloride | 100.0 |
| Sec. calcium phosphate | 150.0 |
| Colloidal silicic acid | 206.0 |
| Magnesium stearate | 4.0 |
| Soluble starch | 8.0 |
| | 480.0 |

Preparation: The mixture of the active substance was granulated in the usual manner with the adjuvants, supporting agents and lubricants and compressed into tablets.

Example C (dragees)

(a) Core

| | Mg. |
|---|---|
| 1-(4'-cyanophenoxy)-2-ethylamino-propane hydrochloride | 60.0 |
| Sec. calcium phosphate | 135.0 |
| Corn starch | 91.0 |
| Colloidal silicic acid | 7.0 |
| Stearic acid | 4.0 |
| Polyvinylpyrrolidone | 3.0 |
| | 300.0 |

Preparation: The mixture of the active substance was granulated in the usual manner with the adjuvants, supporting agents and lubricants and compressed into tablets.

(b) Coating

| | |
|---|---|
| Polyvinylpyrrolidone | 2.0 |
| Talcum | 50.0 |
| Titanium dioxide | 3.0 |
| Gum arabic | 4.0 |
| Sugar | 71.0 |
| | 430.0 |

Preparation: The mixture was suspended in an appropriate solvent, for example water, and applied to the core by means of a spray gun.

Example D (capsules)

A mixture consisting of 80 parts of 1-(3'-cyanophenoxy)-2-amino-propane hydrochloride and 120 parts of cornstarch was filled into hard gelatine capsules.

Example E (depot-dragees)

100 gm. of 1-(3'-cyanophenoxy)-2-methylamino-propane sulfate were admixed with 295 gm. of carboxymethylcellulose and 20 gm. of stearic acid and kneaded thoroughly with a solution of 40 gm. of cellulose acetate-phthalate in 200 ml. of a mixture of ethanol/ethylacetate (1:1) and granulated. From this granulate dragee kernels were pressed in the usual manner, which then were coated with the aid of a sugar containing 5% polyvinyl-pyrrolidone-suspension in water.

Various modifications of the compositions and method of the invention may be made without departing from the spirit or scope thereof.

We claim:

1. A compound selected from the group consisting of 1-phenoxy-2-amino-alkanes of the formula

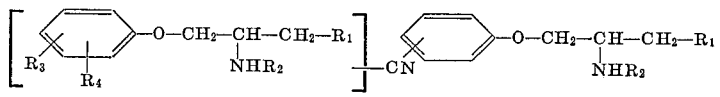

wherein R$_1$ is selected from the group consisting of hydrogen and alkyl of 1 to 3 carbon atoms, R$_2$ is selected from the group consisting of hydrogen and alkyl of 1 to 4 carbon atoms, and their optical antipodes, and their non-toxic, pharmaceutically acceptable acid addition salts.

2. A compound of claim 1 selected from the group consisting of 1-(4'-cyanophenoxy)-2-n-propylaminopropane, its optical antipodes and its non-toxic, pharmaceutically acceptable acid addition salts.

3. A compound of claim 1 selected from the group consisting of 1-(4'-cyanophenoxy)-2-amino-propane, its optical antipodes and its non-toxic, pharmaceutically acceptable acid addition salts.

4. A compound of claim 1 selected from the group consisting of 1 - (4' - cyanophenoxy)-2-isopropylamino-propane, its optical antipodes and its non-toxic, pharmaceutically acceptable acid addition salts.

5. A compound of claim 1 selected from the group consisting of 1-(4'-cyanophenoxy)-2-ethylaminopropane, its optical antipodes and its non-toxic, pharmaceutically acceptable acid addition salts.

6. A compound of claim 1 selected from the group consisting of 1-(2'-cyanophenoxy)-2-ethylaminopropane, its optical antipodes and its non-toxic, pharmaceutically acceptable acid addition salts.

7. A compound of claim 1 selected from the group consisting of 1-(2'-cyanophenoxy)-2-isopropylaminopropane, its optical antipodes and its non-toxic, pharmaceutically acceptable acid addition salts.

8. A compound of claim 1 selected from the group consisting of 1-(2'-cyanophenoxy)-2-propylaminopropane, its optical antipodes and its non-toxic, pharmaceutically acceptable acid addition salts.

9. A compound of claim 1 selected from the group consisting of 1-(3-cyanophenoxy)-2-isopropylaminopropane, its optical antipodes and its non-toxic, pharmaceutically acceptable acid addition salts.

10. A compound of claim 1 selected from the group consisting of 1-(3'-cyanophenoxy)-2-methylaminopropane, its optical antipodes and its non-toxic, pharmaceutically acceptable acid addition salts.

11. A compound of claim 1 selected from the group consisting of 1-(3'-cyanophenoxy)-2-ethylaminopropane, its optical antipodes and its non-toxic, pharmaceutically acceptable acid addition salts.

12. A compound of claim 1 selected from the group consisting of 1-(3'-cyanophenoxy)-2-propylamino-propane, its optical antipodes and its non-toxic, pharmaceutically acceptable acid addition salts.

13. A compound of claim 1 selected from the group consisting of 1-(2'-cyanophenoxy)-2-methylaminopropane, its optical antipodes and its non-toxic, pharmaceutically acceptable acid addition salts.

14. A compound of claim 1 selected from the group consisting of 1-(4'-cyanophenoxy)-2-methylaminopropane, its optical antipodes and its non-toxic, pharmaceutically acceptable acid addition salts.

References Cited

UNITED STATES PATENTS

| | | | |
|---|---|---|---|
| 2,642,436 | 6/1953 | Clinton et al. | 260—465 X |
| 2,683,719 | 7/1954 | Kerwin et al. | 260—570.7 X |
| 2,953,494 | 9/1960 | Cook et al. | 260—340.5 X |
| 2,974,148 | 3/1961 | Cook et al. | 260—340.5 X |
| 3,149,147 | 9/1964 | Anderson et al. | 260—465 |
| 3,198,833 | 8/1965 | Beregi et al. | 260—570.8 |
| 3,205,136 | 9/1965 | Tedeschi | 260—570.7 X |
| 3,221,054 | 11/1965 | Arnold et al. | 260—570.7 |

FOREIGN PATENTS 687,189  2/1953  Great Britain.

CHARLES B. PARKER, Primary Examiner

D. H. TORRENCE, Assistant Examiner

U.S. Cl. X.R.

260—253, 254, 141, 340.5, 347.3, 501.17, 501.19, 570.7, 566, 590; 424—253, 282, 285, 304, 330